United States Patent [19]

Staszkiewicz

[11] 4,019,410
[45] Apr. 26, 1977

[54] ROTARY SUPPORT FOR USE IN A MACHINE TOOL

[76] Inventor: Rudolf Staszkiewicz, Kapellenstrasse 57, 62 Wiesbaden, Germany

[22] Filed: Mar. 7, 1975

[21] Appl. No.: 557,608

[30] Foreign Application Priority Data

Mar. 8, 1974 Germany .......................... 2411059

[52] U.S. Cl. .................................. 82/2.5; 29/38 A; 82/3
[51] Int. Cl.² ................... B23B 13/02; B23B 13/04
[58] Field of Search ................. 82/2.5, 3; 29/38 A, 29/38 B

[56] References Cited

UNITED STATES PATENTS

| | | | |
|---|---|---|---|
| 3,010,348 | 11/1961 | Swanson et al. | 82/2.5 |
| 3,293,960 | 12/1966 | Feldwisch | 82/3 X |
| 3,544,286 | 12/1970 | Oeckl et al. | 408/35 X |
| 3,587,369 | 6/1971 | Reiners et al. | 82/2.5 |

FOREIGN PATENTS OR APPLICATIONS

| | | | |
|---|---|---|---|
| 1,156,292 | 10/1963 | Germany | 82/2.5 |
| 1,075,739 | 7/1967 | United Kingdom | 82/2.5 |

Primary Examiner—Leonidas Vlachos
Attorney, Agent, or Firm—Michael J. Striker

[57] ABSTRACT

A rotary support is mounted on the frame of a machine tool for rotation about an axis, and a plurality of carriers is distributed along a major surface of the rotary support and connected thereto to share its rotation about the axis. Each of the carriers has a carrier axis, and the rotary support can be indexed between a plurality of positions in each of which one of the carrier axes extends parallel to a horizontal plane and other carrier axis extends normal thereto. The carrier axes may intersect the axis of rotation of the rotary support, or they may be offset therefrom so as to generate a hyperboloid during the rotation of the rotary support. The rotary support may be used for moving workpieces toward a tool and a workpiece-transporting arrangement may be associated with the rotary support for supplying workpieces thereto and removing finished workpieces therefrom. The workpiece-transporting arrangement has only two degrees of freedom of movement, one of them coinciding with the carrier axis which extends normal to the plane. The carriers may be driven into rotation about their respective carrier axes in at least one of said positions.

12 Claims, 8 Drawing Figures

ROTARY SUPPORT FOR USE IN A MACHINE TOOL

BACKGROUND OF THE INVENTION

The present invention relates to a rotary support for use in a machine tool. More particularly, the present invention relates to a rotary support to be used for transporting workpieces into the region of operation of a tool.

There are already known various machine tools, for instance such in which a plurality of tools or of workpieces is mounted on a rotary support which revolves about its axis so as to bring the tools or the workpieces into a plurality of positions, whereupon the rotary support is arrested so that the particular cutting or other materials-removing operation can be performed on the workpiece. This movement and arresting will be hereinafter referred to as indexing. When the rotary support is used for supporting the workpieces, it includes a plurality of workpiece carriers to which the workpieces can be secured, and some of the carriers in any indexed position of the rotary support may be driven into rotation, while at least one of the carriers may be stopped in order to be able to remove a workpiece which has previously been acted upon by the tool, and to replace the same by a new workpiece. This arrangement is very useful and has found widespread application in connection with machine tools, such as lathes. The advantage of this arrangement is to be seen in the fact that the replacement of a finished workpiece may be conducted simultaneously with performing the material-removing operation on a different workpiece, which cuts down on the time needed for finishing the article by significantly reducing the idle time of the machine.

In conventional machine tools utilizing a revolving support of the above-discussed type, the supporting surfaces of the carriers which determine the position of the workpieces with respect to the rotary support and thus with respect to the material-removing tool, are usually located in the same plane. It is already known to so arrange the rotary support that the plane in which the supporting surfaces are located extends substantially horizontally, substantially vertically, or at an angle to the horizontal. In all of these conventional arrangements, however, the supporting surfaces are located in the same plane or at least in parallel planes, regardless of the position which each particular carrier assumes.

Experience with these arrangements has shown that some disadvantages attach thereto, regardless of the angle which the above-mentioned plane encloses with the horizontal. So, for instance, when the supporting surfaces are located in a substantially vertical plane, it is necessary during the removal of the finished workpiece and its replacement by a new one not only to overcome the weight of the workpiece, but also to compensate for the moment which attempts to tilt the workpiece away from the supporting surface. This task must be performed by the conveyor or a similar manipulating arrangement which removes and delivers the workpieces prior to the attachment of the respective workpiece to the workpiece carrier, or the carrier itself or the arrangement for attaching the workpiece to the carrier must perform these two tasks. When workpieces of relatively large dimensions and thus of considerable weight are to be thus transported and attached to the respective carriers, and when these operations are to be performed manually, a high degree of skill is required from the operator, and also a considerable expenditure of energy. On the other hand, when the transportation and attaching to the carriers is performed by an automatically working mechanism, the latter will have to be rather complex, particularly when the cylindrical workpieces which are to be shaped in the machine tool by material-removing operations are elongated since then it is customary to transport these workpieces in substantially upright position, so that these workpieces must be tilted into a substantially horizontal position prior to their clamping in or other attachment to the carrier. In order to avoid the need for tilting the elongated cylindrical workpieces prior to their attachment to their respective carriers, it has already been proposed to so arrange the rotary support that the supporting surfaces of the respective carriers are located in a substantially horizontal plane. Other advantages of this horizontal arrangement of the support surfaces are that the carriers themselves will support the workpieces, thus overcoming their weights, and that the tendency of the workpieces to tilt away from the supporting surfaces is not present in this case. Thus, the handling of the workpieces is considerably simplified in this arrangement when compared to the rotary supports in which the supporting surfaces are located in the vertical plane; however, the turnings or chips which are removed from the workpiece during the material-removing operation will fall onto and accumulate on the rotary support and on the carriers where they will interfere with the proper operation of the carriers, unless they are periodically and rather often removed. However, experience has shown that the removal of the turnings or chips is rather difficult and cannot always be performed to complete satisfaction.

Finally, when the supporting surfaces of the carriers are located in a plane which extends at an angle to the horizontal, not only is it not assured that the turnings or chips are removed from the rotary support and from the carriers at each material-removing operation, but also the workpiece transporting and attaching operations are rather complicated.

In order to avoid the above-mentioned disadvantages, it has already been proposed to mount a workpiece carrier on a support which is mounted on the frame of the machine tool for pivoting about a substantially horizontal axis between one position in which the support surface extends substantially horizontally, and another position in which the support surface extends substantially vertically, the material-removing operation being performed when the support surface is in the latter position. However, even this arrangement is disadvantageous, in that this arrangement is capable of handling only a single workpiece at a time, that is the workpiece must be first attached to the carrier, then the support is pivoted, then the material-removing operation performed, and the support is subsequently pivoted back into its initial position, and only then the workpiece which has been just operated on is removed and replaced by a new workpiece. This, of course, involves a substantial increase in the idle time of the machine tool, since the time period for pivoting the support between the two positions thereof is to be added to the time needed for positioning the workpiece on the carrier and removing the same therefrom subsequently to the performance of the material-removing operation.

SUMMARY OF THE INVENTION

It is a general object of the present invention to avoid the disadvantages of the prior art.

More particularly, it is an object of the present invention to provide a rotary support for workpieces which is not possessed of the disadvantages of the prior art arrangements.

It is yet another object of the present invention to provide a rotary support for use in a machine tool which cuts down on the idle time of the machine tool between individual material-removing operations.

In pursuance of these objects and others which will become apparent hereafter, one of the features of the present invention resides, in a machine tool, in a combination comprising a frame on which a support is mounted for rotation about a support axis. A plurality of carriers is mounted on the support so as to share the rotation thereof about the support axis and each of the carriers has a carrier axis. An arrangement is further provided which indexes the support about the support axis between a plurality of positions in each of which one of the carrier axes is substantially normal to a horizontal plane, and another carrier axis is substantially parallel to such plane.

In one of the currently preferred embodiments of the present invention, the carriers are mounted on the support for rotation about the carrier axes, and a drive arrangement is provided which drives at least one of the carriers into rotation about its axis. The drive arrangement imparts rotary motion to the carrier, and via the same to the workpiece which is attached thereto, so that the tool has to perform only a simple translatory motion with respect to the carrier axis which at that time extends substantially parallel to the horizontal plane. Thus, it is achieved that the turnings or chips which by gravity will tend to fall vertically will not contact the support and accumulate thereon, while the just-finished workpiece can be removed from the carrier which at that time has its carrier axis extending substantially vertically, and replaced by a new workpiece.

An especially simple construction of the support of the present invention obtains when two or three of such carriers are mounted on a round support in such a manner that the carrier axes always extend parallel to the generatrices of an imaginary cone the axis of which coincides with the support axis, the latter axis enclosing an angle with the horizontal plane, one of the generatrices being substantially vertical, and another one or two generatrices being substantially horizontal. The carrier axes can coincide with the generatrices of the imaginary cone so that they will intersect the support axis in a common point.

On the other hand, it is also possible, and contemplated by the present invention, that the carrier axes may be offset with respect to the generatrices of the imaginary cone in the tangential direction thereof, still being parallel thereto so that, as the rotary support rotates, the carrier axis of the respective carrier generates an imaginary hyperboloid coaxial with the imaginary one. In this event, the carrier axes are skew lines with respect to one another and to the support axis, which may be useful in many applications. So, for instance, it is possible with this arrangement to obtain additional available space for the location of the mechanisms which attach the workpieces to the respective carriers as well as for other mechanisms.

In the currently preferred embodiment of the present invention, the plane in which the rotary support rotates, that is the plane which is perpendicular to the support axis, encloses an acute angle of 45° with the horizontal plane. When this angle is selected in the clockwise direction, then the support surface of the carrier, the carrier axis of which extends substantially vertically, faces upwardly. In this position, the transportation of the workpieces and their placing on the supporting surface is especially simple, particularly when conveyor devices are used from which the workpieces are suspended, such as an overhead conveyor. On the other hand, when the acute angle is selected in the counterclockwise direction, then the supporting surface of the carrier, the carrier axis of which extends substantially vertically, faces downwardly. In this embodiment, the delivery of the workpieces to the respective carrier is also very simple in that a simple lifting support can be used which is mounted on the frame of the machine tool for movement in a substantially horizontal direction and which is capable of lifting the workpiece to be attached to the respective carrier into contact with the supporting surface. The lifting table or support in this embodiment may be supported on rails which extend transversely of the frame of the machine tool and toward and beyond the front thereof so that the placing of the workpieces on the lifting table and their removal therefrom are simplified. In addition thereto, this embodiment of the present invention permits the arrangement of the guide tracks for the tool support upwardly of the axis of rotation of the workpiece attached to the respective carrier whose carrier axis at that time extends substantially horizontally, so that the frame of the machine tool may be of a very sturdy construction and the turnings or chips which are formed during the material-removing operation cannot interfere either with the operation of the support or of the tool support and the tracks therefor.

The advantages obtained by the present invention are manifold. First of all, the idle time of the machine tool is almost eliminated, the only idle time between two successive operations being attributable to the time needed for returning the tool into the original position and for indexing the rotary support. This idle time is further reduced when the carrier axes are offset with respect to the imaginary cone as previously discussed, since then the support can be so constructed as to significantly reduce its mass and particularly its inertia, so that the indexing of the rotary support can be accomplished relatively rapidly.

Another advantage of this invention is that the space in which the workpiece is delivered to and removed from the rotary support can be separated from the space in which the material-removing operations are performed, so that interference of these two operations is eliminated without any additional arrangements. Furthermore, the workpieces can be delivered to and removed from an immediate vicinity of the support by simple roller conveyors or overhead conveyors. Simple manipulating mechanisms having only two degrees of freedom of movement can be used for placing the workpieces on the respective carriers and removing the same therefrom. Furthermore, the space in which the material-removing operations are performed is devoid from all other devices or mechanisms which renders possible the arrangement of various devices for guiding and removing the turnings or chips, which are formed during the material-removing operations, in an optimum manner. Since the workpieces which have just been subjected to the material-removing operation are removed from the space in which such operations are performed while still attached to their respective carriers, it is possible to inspect and measure the workpieces following the material-removing operation before the connection between the workpiece and the respective carrier is discontinued. Should such be necessary, it is possible to return the workpiece into the region of operation of the tool so as to correct any deviations from the proper shape which may have occurred during the previous material-removing operation.

The novel features which are considered as characteristic for the invention are set forth in particular in the appended claims. The invention itself, however, both as to its construction and its method of operation, together with additional objects and advantages thereof, will be best understood from the following description of specific embodiments when read in connection with the accompanying drawing.

DETAILED DISCUSSION OF THE PREFERRED EMBODIMENTS

Figure 1:
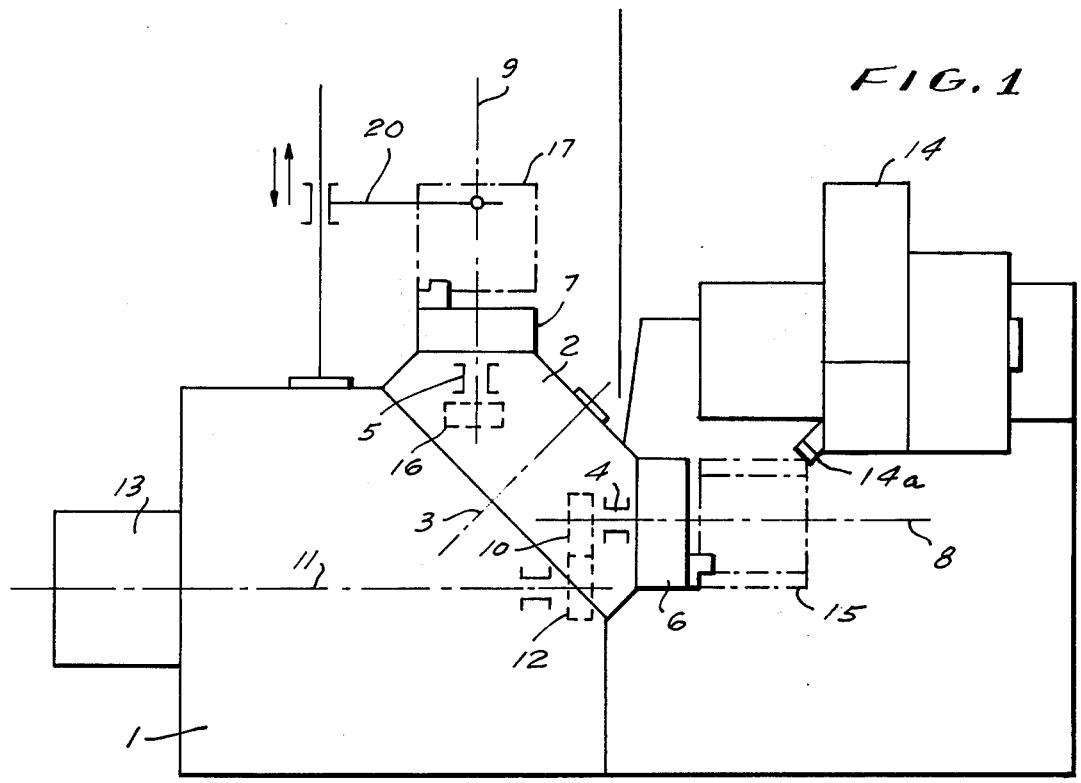
FIG. 1 is a front view of a first embodiment of the present invention as used in a lathe.
Figure 2:
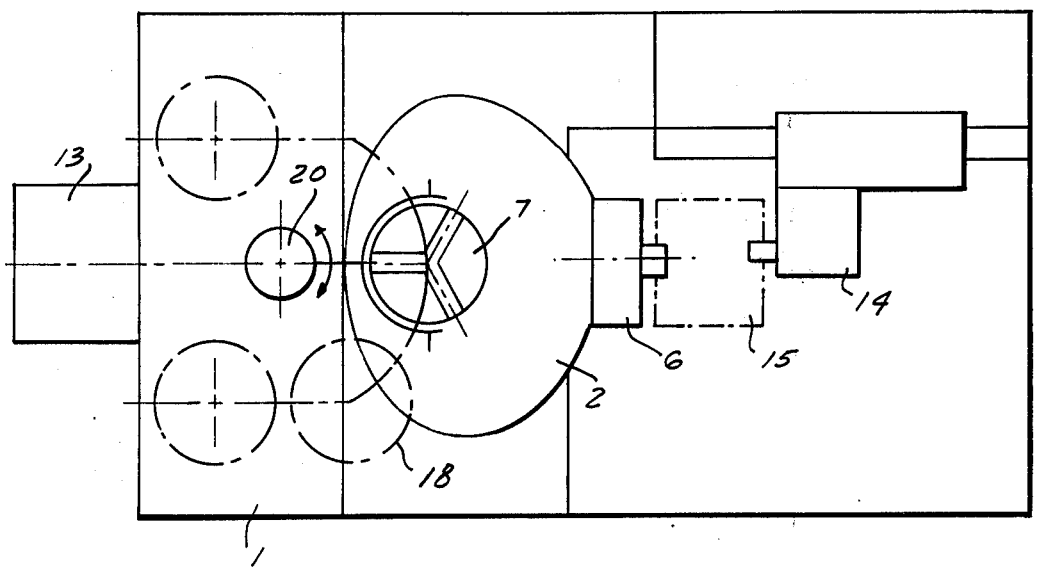
FIG. 2 is a top plan view of the embodiment of FIG. 1.
Figure 3:
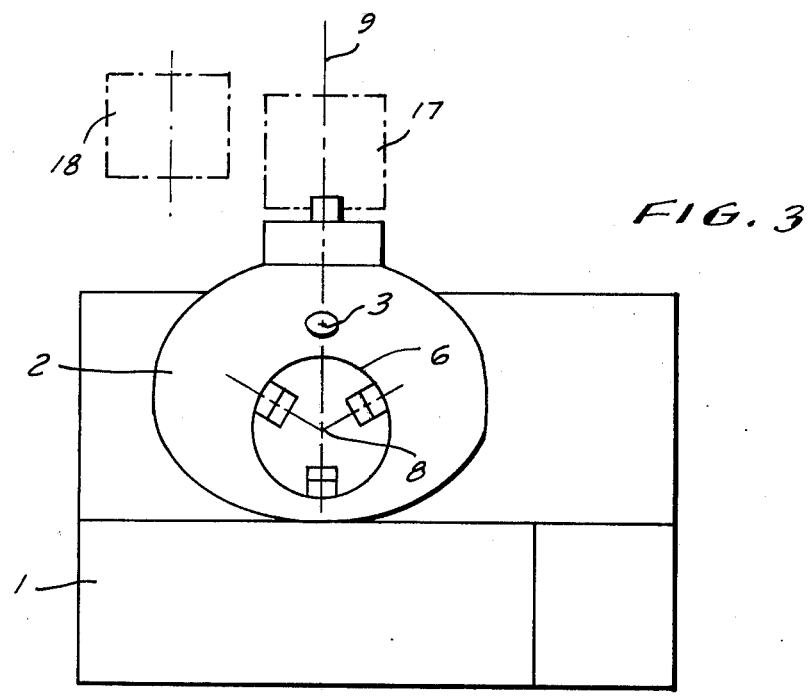
FIG. 3 is a side view of the embodiment of FIG. 1 with the tool support being omitted.

Referring now to the drawings, and first to FIGS. 1 to 3 thereof, it may be seen that the machine tool has a frame 1 on which there is mounted, for rotation about a support axis 3 which is inclined with respect to a horizontal plane, a rotary support 2. An indexing arrangement of conventional design (not shown) rotates the rotary support 2 about the axis 3 and arrests the same in at least two positions. The present invention is illustrated as embodied in a rotary support which can be indexed between two positions which are offset with respect to one another by an angle of 180°, but it is to be understood that the support may be indexed between any convenient number of positions. The rotary support 2 carries two bearings 4, 5 on which two workpiece carriers 6, 7 are mounted for rotation about carrier axes 8, 9 which are perpendicular to one another and located in a common plane with the support axis 3. The axis 8 extends substantially horizontally, and a gear 10 is provided which is connected to the carrier 6 so as to be able to rotate about the carrier axis 8. A gear 12 is mounted on the frame 1 for rotation about an axis 11 so that, when the rotary support 2 is in the illustrated position, the gear 10 meshes with the gear 12 and the carrier 6 is driven into rotation by means of a motor 13 of a conventional construction. A material-removing tool 14a is mounted in a reciprocating support 14 which is mounted on the frame 1 for reciprocation at least in parallelism with the axis 8. In the illustrated position, the tool 14a contacts the surface of a workpiece 15 which is attached to the carrier 6, and performs material-removing operations thereon.

The carrier 7 is mounted on the rotary support 2 for rotation about a substantially vertically extending axis 9, a gear 16 being mounted on the carrier 7 for rotation about the axis 9. However, since the gear 16 in the illustrated position thereof does not mesh with the gear 12, it is possible to terminate the rotation of the rotary support 7 and, if necessary, and if non-illustrated positioning device is provided, to position the carrier 7 about the axis 9. A workpiece 17 which has just undergone a material-removing operation can be removed from the carrier 7 and replaced by a new workpiece 18 in the manner more particularly illustrated in FIG. 2. These axes 8 and 9, as already mentioned before, are located in a common plane with the support axis 3 and they intersect the same in a common point so that the axes 8 and 9 generate an imaginary cone during the rotation or indexing of the rotary support 2.

A partitioning wall 19 is provided which separates the working space, in which the reciprocating support 14 and the cutting tool 14a are located, from the space where the workpieces 15, 17 and 18 are being attached to and removed from the respective carriers 6, 7. The provision of the partitioning wall 19 assures that the chips or turnings detached during the material-removing operation from the surface of the respective workpiece 15, 17 and 18 will not enter the space designed for removing and supplying the workpieces. However, since the partitioning wall 19 extends into the trajectory of movement of the workpieces 15, 17 and 18 while mounted on the respective carriers 6, 7, it is necessary to remove, by conventional means, the partitioning wall 19 from such trajectory during the indexing of the rotary support 2. A manipulating mechanism 20 is provided at the upper part of the frame 1 which has two degrees of freedom of movement and serves for removing the finished workpieces 17 from, and placing new workpieces 18 on, the respective support 6, 7.

Figure 4:
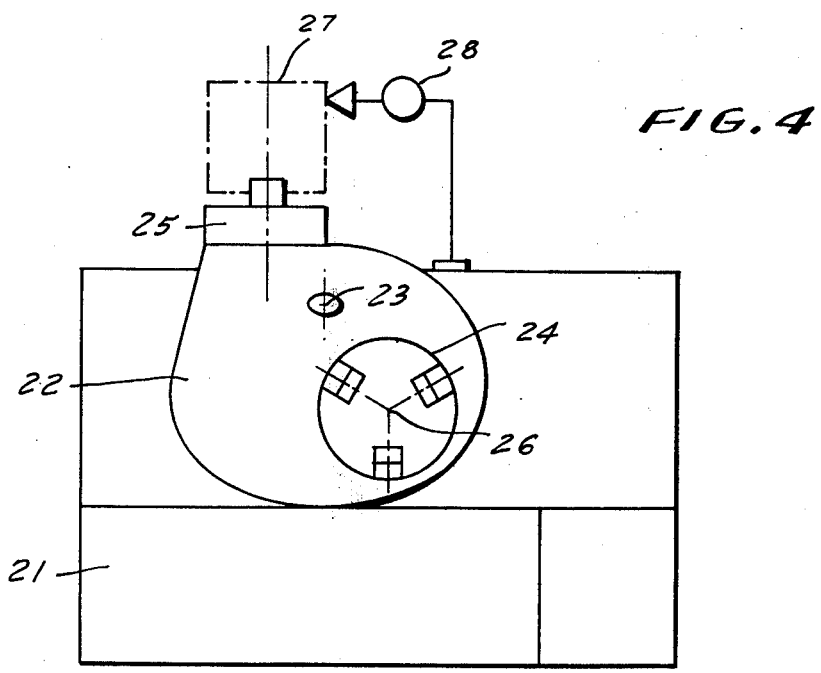
FIG. 4 is a side view similar to FIG. 3 but of a different embodiment of the present invention wherein the axes of the carriers are offset with respect to one another and to the axis of rotation of the workpiece support.

A modified embodiment of the present invention is illustrated in FIG. 4, wherein carrier axes 26 and 27 of carriers 24, 25 are parallel to but offset from the generatrices of the above-mentioned cone in the tangential direction thereof. In other words, the carrier axes 26, 27 constitute skew lines with respect to one another and to a support axes 23 of a rotary support 22 so that the carrier axes 26, 27 generate, during the rotation of the rotary support 22, an imaginary hyperboloid whose central axis coincides with the support axis 23. In all other respects, this arrangement is similar to that previously described in connection with FIGS. 1 to 3. In addition thereto, a measuring device 28 is provided at the upper surface of the frame 1 which serves for measuring and inspecting the finished workpiece 17.

It may be seen from the drawings that the carriers 6, 7, 25, 26 are constructed as conventional chucks which are well known in the art of clamping workpieces and thus will not be described in any detail. Furthermore, it is to be understood that any other conventional means may be used for attaching the workpieces to the rotary support as long as it is assured that the axes of the cylindrical workpieces will extend normal to one another, as considered in space, in the respective mounting material-removing positions thereof. For some applications and material-removing operations, it may be useful to provide several clamping devices or carriers at each location of the rotary support, in which case the carrier axes of these associated carriers may extend parallel to one another. This renders possible to simultaneously perform material-removing operations on several workpieces.

Figure 8:
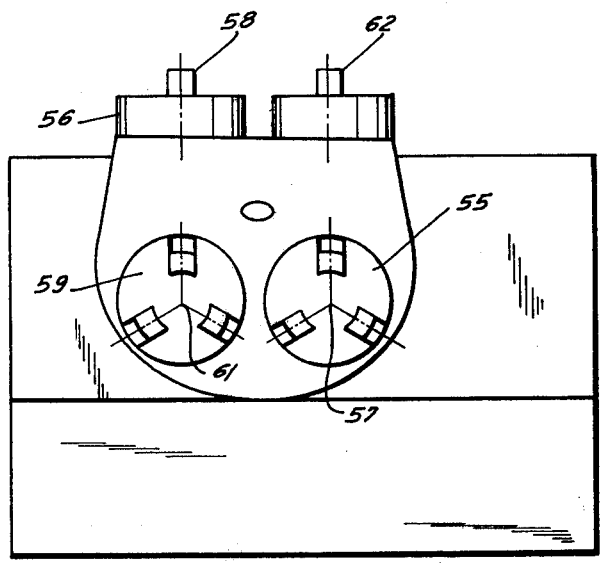
FIG. 8 is a side view similar to FIG. 3 of a still other embodiment wherein two carriers are arranged at each location and their axes are parallel to one another.

This possibility is illustrated in FIG. 8 which shows that a pair of carriers 55 and 59, or 56 and 60, is provided at each of the locations and mounted for rotation about respective carrier axes 57, 61; 58, 62.

Figure 5:
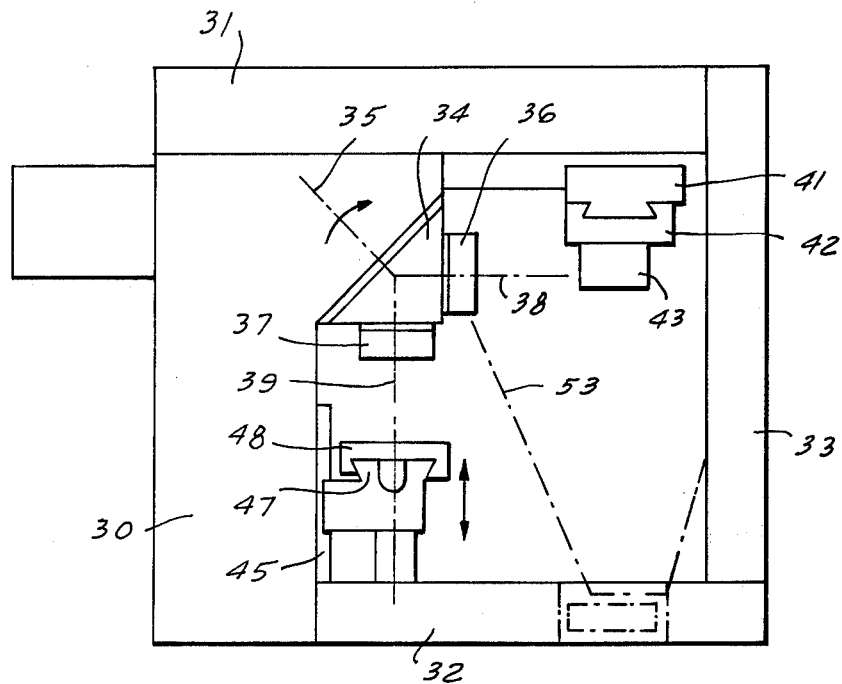
FIG. 5 is a front view of a different embodiment of the present invention as employed in a lathe, and with a lifting table.
Figure 6:
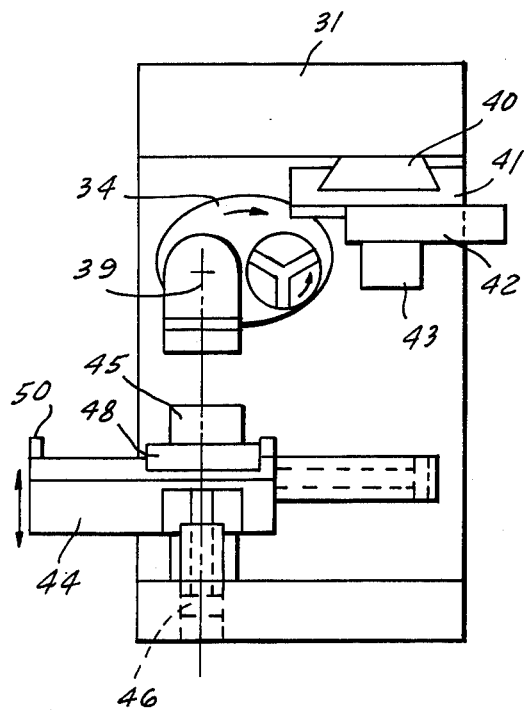
FIG. 6 is a side view of the embodiment of FIG. 5 with some parts of the frame being omitted.
Figure 7:
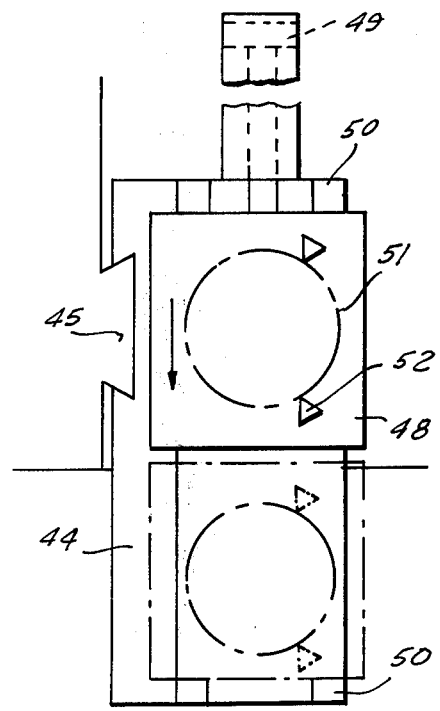
FIG. 7 is an enlarged top plan view of the lifting table of FIG. 5.

FIGS. 5 to 7 illustrate a machine tool, such as a lathe, in which the supporting surface of the carrier 37 faces downwardly when it is in the illustrated position. The frame of the machine tool is designated in this embodiment with the reference numeral 30, and it is a part of a closed frame which further includes an upper frame portion 31 which carries thereon tracks 41 on which a reciprocating support 43 is mounted for displacement via a member 42; a basis 32; and a connecting portion 33. A rotary support 34 is mounted on the frame 30 for rotation with respect thereto about a support axis 35 in a manner similar to that described in connection with FIGS. 1 to 3, the rotary support 34 being indexed by conventional arrangements, and supported on bearings which are also completely conventional and thus have not been illustrated. Carriers 36 and 37 are mounted on the support 34 for rotation about axes 38, 39 which also may be laterally offset with respect to the support axis 35 of the rotary support 34 as also previously described so that the axes 38, 39 may again generate an imaginary hyperboloid. As already explained, the supporting surface of the carrier 37 faces downwardly when the carrier axis 39 extends substantially vertically.

A guide rail 45 is provided underneath the carrier 37 which extends substantially vertically. A lifting table 44 is provided with a lifting arrangement 46 and is mounted on the guide rail 45 for displacement, and the lifting arrangement 46 is capable of elevating the lifting table 44 so that a workpiece situated on the lifting table 44 is brought into contact with the carrier 37. A transverse sled 48 is mounted on the lifting table 44 by means of a guide rail 47 and is actuated by a cylinder-and-piston unit 49 for movement between abutments 50 so that the sled 48 can be displaced in front of the machine tool. Thus, a workpiece 51 can be positioned on the transverse sled 48 in front of the machine tool and aligned with centering abutments 52. Then, the sled is moved towards its position in which it is located underneath the carrier 37 so that the axis of rotation of the workpiece 51 coincides with the carrier axis 39, and the lifting table 44 is elevated until the workpiece 51 abuts against the carrier 37. Subsequently thereto, the workpiece 51 is attached to the carrier 37 in any conventional manner.

It will be understood that each of the elements described above, or two or more together, may also find a useful application in other types of machine tools differing from the types described above.

While the invention has been illustrated and described as embodied in a rotary support for use in machine tools, it is not intended to be limited to the details shown, since various modifications and structural changes may be made without departing in any way from the spirit of the present invention.

Without further analysis, the foregoing will so fully reveal the gist of the present invention that others can by applying current knowledge readily adapt it for various applications without omitting features that, from the standpoint of prior art, fairly constitute essential characteristics of the generic or specific aspects of this invention and, therefore, such adaptations should and are intended to be comprehended within the meaning and range of equivalence of the following claims.

What is claimed as new and desired to be protected by Letters Patent is set forth in the appended claims:

1. In a machine tool, a combination comprising a frame; a support mounted on said frame for rotation about a support axis; a plurality of carriers mounted on said support so as to share the rotation thereof about said support axis, each of said carriers having a carrier axis and a supporting surface substantially normal to said carrier axis; means for indexing said support about said support axis between a plurality of positions in each of which one of said carrier axis is substantially normal to a horizontal plane and the respective supporting surface faces downwardly and another carrier axis is substantially parallel to said plane; and conveyor means for supplying workpieces to a respective carrier the carrier axis of which extends normal to said plane, and for withdrawing finished workpieces therefrom, including a lifting table, and means for lifting said table toward said respective supporting surface so as to bring a workpiece supported on said table into contact with said respective supporting surface.

2. A combination as defined in claim 1, and further comprising means for rotating said carriers about their respective carrier axes.

3. A combination as defined in claim 2, wherein said rotating means is operative for rotating a respective carrier at least when said carrier axis thereof extends parallel to said plane.

4. A combination as defined in claim 1, and further comprising means for attaching a workpiece to a respective carrier.

5. A combination as defined in claim 1; said lifting table further including a transverse sled, and means for displacing said sled parallel to said plane.

6. A combination as defined in claim 1, wherein said carrier axes intersect said support axis; and wherein said carrier axes generate an imaginary cone during the indexing movement of said rotary support.

7. A combination as defined in claim 1, wherein said carrier axes are skew lines with respect to one another and to said support axis; and wherein said carrier axes generate an imaginary hyperboloid during the indexing movement of said rotary support.

8. A combination as defined in claim 1; and further comprising means for inspecting and measuring workpieces, said inspecting and measuring means being mounted on said frame adjacent said rotary support.

9. In a machine tool, a combination comprising a frame; a support mounted on said frame for rotation about a support axis; a plurality of carriers mounted on said support so as to share the rotation thereof about said support axis, said carriers having respective carrier axes which are skew lines with respect to one another and to said support axis and respective supporting surfaces substantially normal to the respective carrier axes; means for indexing said support about said support axis between a plurality of positions in each of which one of said carrier axes is substantially normal to a horizontal plane and the respective supporting surface faces upwardly, and another carrier axis is substantially parallel to said plane, said carrier axes generating a single imaginary hyperboloid around said support axis during the indexing movement of said rotary support; and conveyor means for supplying workpieces to a respective carrier the carrier axis of which extends normal to said plane, and for withdrawing finished workpieces therefrom.

10. A combination as defined in claim 9; and further comprising means for manipulating workpieces, said manipulating means being mounted on said frame and operative for supplying workpieces to, and withdrawing the same from, the respective carriers.

11. In a machine tool, a combination comprising a frame; a support mounted on said frame for rotation about a support axis; a plurality of carriers mounted on said support so as to share the rotation thereof about said support axis, said carriers having respective carrier axes which are skew lines with respect to one another and to said support axis and respective supporting surfaces substantially normal to the respective carrier axes; means for indexing said support about said support axis between a plurality of positions in each of which one of said carrier axes is substantially normal to a horizontal plane and the respective supporting surface faces downwardly, and another carrier axis is substantially parallel to said plane, said carrier axes generating a single imaginary hyperboloid around said support axis during the indexing movement of said rotary support; and conveyor means for supplying workpieces to a respective carrier the carrier axis of which extends normal to said plane, and for withdrawing finished workpieces therefrom, including a lifting table, and means for lifting said table toward said respective supporting surface so as to bring a workpiece supported on said table into contact with said respective supporting surface.

12. A combination as defined in claim 11, and further comprising at least one additional carrier associated with each of said carriers, the carrier axis of said additional carrier extending parallel to said carrier axis of the respective carrier.

* * * * *